(12) United States Patent
Czapka et al.

(10) Patent No.: US 11,135,915 B2
(45) Date of Patent: Oct. 5, 2021

(54) SYSTEM AND METHOD FOR PROVIDING IMPLEMENT-BASED SPEED CONTROL FOR A WORK VEHICLE

(71) Applicant: CNH Industrial America LLC, New Holland, PA (US)

(72) Inventors: Jason T. Czapka, Munster, IN (US); Kevin D. McKee, Naperville, IL (US); Kevin M. Smith, Narvon, PA (US); Robert J. Longua, Palatine, IL (US); Keith W. Wendte, Willowbrook, IL (US); Marvin A. Prickel, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 242 days.

(21) Appl. No.: 16/250,328

(22) Filed: Jan. 17, 2019

(65) Prior Publication Data
US 2019/0143814 A1 May 16, 2019

Related U.S. Application Data

(63) Continuation of application No. 15/416,031, filed on Jan. 26, 2017, now Pat. No. 10,308,116.

(51) Int. Cl.
*B60K 31/00* (2006.01)
*A01C 7/10* (2006.01)
(Continued)

(52) U.S. Cl.
CPC .............. *B60K 31/00* (2013.01); *A01C 7/102* (2013.01); *A01C 7/105* (2013.01); *A01C 21/00* (2013.01);
(Continued)

(58) Field of Classification Search
None
See application file for complete search history.

(56) References Cited

U.S. PATENT DOCUMENTS 4,085,862 A    4/1978  Steffen
5,621,666 A    4/1997  O'Neall et al.
(Continued)

OTHER PUBLICATIONS

Farm Industry News, Machines Get Two-Way Communication, dated Sep. 28, 2016 (4 Pages).

*Primary Examiner* — Todd Melton
(74) *Attorney, Agent, or Firm* — Rebecca L. Henkel; Rickard K. DeMille

(57) ABSTRACT

In one aspect, a system for providing implement-based speed control for a work vehicle may include a planter controller provided in operative association with a planter towed by the work vehicle and a vehicle controller provided in operative association with the work vehicle. The planter controller may be configured to access an input associated with at least one predetermined threshold value for an operating parameter of the planter and monitor the operating parameter relative to the predetermined threshold value(s) as the planter is being towed at a current ground speed of the work vehicle. In addition, when the operating parameter differs from the predetermined threshold value(s), the planter controller may be configured to adjust a speed control request transmitted to the vehicle controller to cause the current ground speed of the work vehicle to be automatically increased or decreased between predetermined maximum and minimum speed values set for the work vehicle.

14 Claims, 11 Drawing Sheets

(51) Int. Cl.
  *A01C 21/00*  (2006.01)
  *A01C 7/20*   (2006.01)
  *A01B 67/00*  (2006.01)
  *A01B 79/00*  (2006.01)

(52) U.S. Cl.
  CPC ............ *A01B 67/00* (2013.01); *A01B 79/005* (2013.01); *A01C 7/205* (2013.01)

(56) References Cited

U.S. PATENT DOCUMENTS

| | | |
|---|---|---|
| 5,956,255 A | 9/1999 | Flamme |
| 6,131,062 A | 10/2000 | Nielsen |
| 6,701,857 B1 | 3/2004 | Jensen et al. |
| 6,863,006 B2 | 3/2005 | Sandoval et al. |
| 7,010,425 B2 * | 3/2006 | Gray ................... A01B 69/008 172/2 |
| 7,574,290 B2 | 8/2009 | Gibson et al. |
| 8,738,228 B2 | 5/2014 | Filev et al. |
| 8,738,243 B2 | 5/2014 | Sauder et al. |
| 9,119,348 B2 | 9/2015 | Martin et al. |
| 9,145,659 B2 | 9/2015 | Walz et al. |
| 9,221,340 B2 | 12/2015 | Byers et al. |
| 9,333,858 B2 | 5/2016 | Huber et al. |
| 9,756,779 B2 | 9/2017 | Wilhelmi et al. |
| 9,883,626 B2 * | 2/2018 | Heim ..................... A01C 7/102 |
| 2014/0121910 A1 | 5/2014 | Carr et al. |
| 2014/0196919 A1 | 7/2014 | Kowalchuk |
| 2015/0305226 A1 | 10/2015 | Zemenchik |
| 2016/0165789 A1 | 6/2016 | Gervais et al. |
| 2018/0153092 A1 * | 6/2018 | Moorehead ............ A01C 7/046 |

* cited by examiner

SYSTEM AND METHOD FOR PROVIDING IMPLEMENT-BASED SPEED CONTROL FOR A WORK VEHICLE

CROSS-REFERENCE TO RELATED APPLICATIONS

This application is a continuation of and claims the right of priority to U.S. patent application Ser. No. 15/416,031, filed Jan. 26, 2017, the disclosure of which is hereby incorporated by reference herein in its entirety for all purposes.

FIELD OF THE INVENTION

The present subject matter relates generally to work vehicles and, more particularly, to a system and method for providing implement-based speed control for a work vehicle via an auxiliary or separate controller of an implement being towed by the work vehicle.

BACKGROUND OF THE INVENTION

A wide range of agricultural implements are known, are presently in use, and are particularly designed for towing behind a work vehicle, such as a tractor. For example, planting implements, such as planters, typically include multiple row units distributed across a width of the implement. Each row unit is configured to deposit seeds at a desired depth beneath the soil surface, thereby establishing rows of planted seeds. For example, each row unit may include a ground engaging tool or opener (e.g., an opener disc) that forms a seeding path for seed deposition into the soil. In certain configurations, a gauge wheel is positioned a vertical distance above the opener to establish a desired trench depth for seed deposition into the soil. As the implement travels across a field, the opener excavates a trench into the soil, and seeds are deposited into the trench. In certain row units, the opener is followed by a furrow closing system that closes the seed trench.

Using conventional control systems, an operator typically manually adjusts one or more operating parameters of the planter and/or associated work vehicle to control the desired spacing and/or depth of the seeds being deposited by the row units and/or to otherwise adjust the planter productivity. For instance, this often takes the form of the operator manually controlling the ground speed of the work vehicle to adjust the current planting speed. However, such manual operation can result in significant operator fatigue. Moreover, with an inexperienced operator, the operator may manually set the ground speed at a value that does not provide for optimal planting productivity and/or efficiency.

Accordingly, a system and method for providing implement-based speed control that allows the ground speed of a work vehicle to be automatically adjusted by an auxiliary or separate controller of a planter being towed by the work vehicle would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for providing implement-based speed control for a work vehicle. The system may include a planter including a plurality of row units, with each row unit being configured to deposit seeds within the ground as the planter is being towed by the work vehicle. The system may also include a planter controller provided in operative association with the planter, with the planter controller being configured to control the operation of the plurality of row units. Additionally, the system may include a vehicle controller communicatively coupled to the planter controller, with the vehicle controller being provided in operative association with the work vehicle and configured to control the operation of the work vehicle. The planter controller may be configured to access a planter control input associated with at least one predetermined threshold value for an operating parameter of the planter, with the operating parameter being associated with at least one of a depth or a spacing of the seeds deposited by the row units. Moreover, the planter controller may be configured to monitor the operating parameter relative to the at least one predetermined threshold value as the planter is being towed at a current ground speed of the work vehicle and, when the operating parameter differs from the at least one predetermined threshold value, adjust a speed control request transmitted to the vehicle controller to cause the current ground speed of the work vehicle to be automatically increased or decreased between predetermined maximum and minimum speed values set for the work vehicle.

In another aspect, the present subject matter is directed to a method for providing implement-based speed control for a work vehicle towing a planter having a plurality of row units, wherein the work vehicle includes a vehicle controller configured to control the operation of the work vehicle and the planter includes a planter controller configured to control the operation of the plurality of row units. The method may include accessing, with the planter controller, a predetermined maximum speed value and a predetermined minimum speed value for the work vehicle and accessing, with the planter controller, a planter control input associated with at least one predetermined threshold value for a down force parameter for at least one row unit of the plurality of row units. In addition, the method may include monitoring, with the planter controller, the down force parameter relative to the at least one predetermined threshold value as the planter is being towed at a current ground speed of the work vehicle and, when the down force parameter differs from the at least one predetermined threshold value, adjusting, with the planter controller, a speed control request transmitted to the vehicle controller to cause the current ground speed of the work vehicle to be automatically increased or decreased between the predetermined maximum and minimum speed values set for the work vehicle.

In a further aspect, the present subject matter is directed to a method for providing implement-based speed control for a work vehicle towing a planter having a plurality of row units, wherein the work vehicle includes a vehicle controller configured to control the operation of the work vehicle and the planter includes a planter controller configured to control the operation of the plurality of row units. The method may include accessing, with the planter controller, a planter control input associated with at least one predetermined threshold value for an operating parameter of at least one row unit of the plurality of row units, wherein the operating parameter corresponds to at least one of a down force parameter or a seed-related parameter. The method may also include monitoring, with the planter controller, the operating parameter relative to the at least one predetermined threshold value as the planter is being towed at a current ground speed of the work vehicle and, when the operating parameter differs from the at least one predetermined threshold value, automatically adjusting, with the planter controller, an operation of at least one component of the at least one row unit in an attempt to reduce the difference between the operating parameter and the at least one predetermined threshold value. In addition, the method may include adjusting, with the planter controller, a speed control request transmitted to the vehicle controller indicating that the current ground speed of the work vehicle should be increased or decreased when the adjustment of the operation of the at least one component does not reduce the difference between the operating parameter and the at least one predetermined threshold value.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
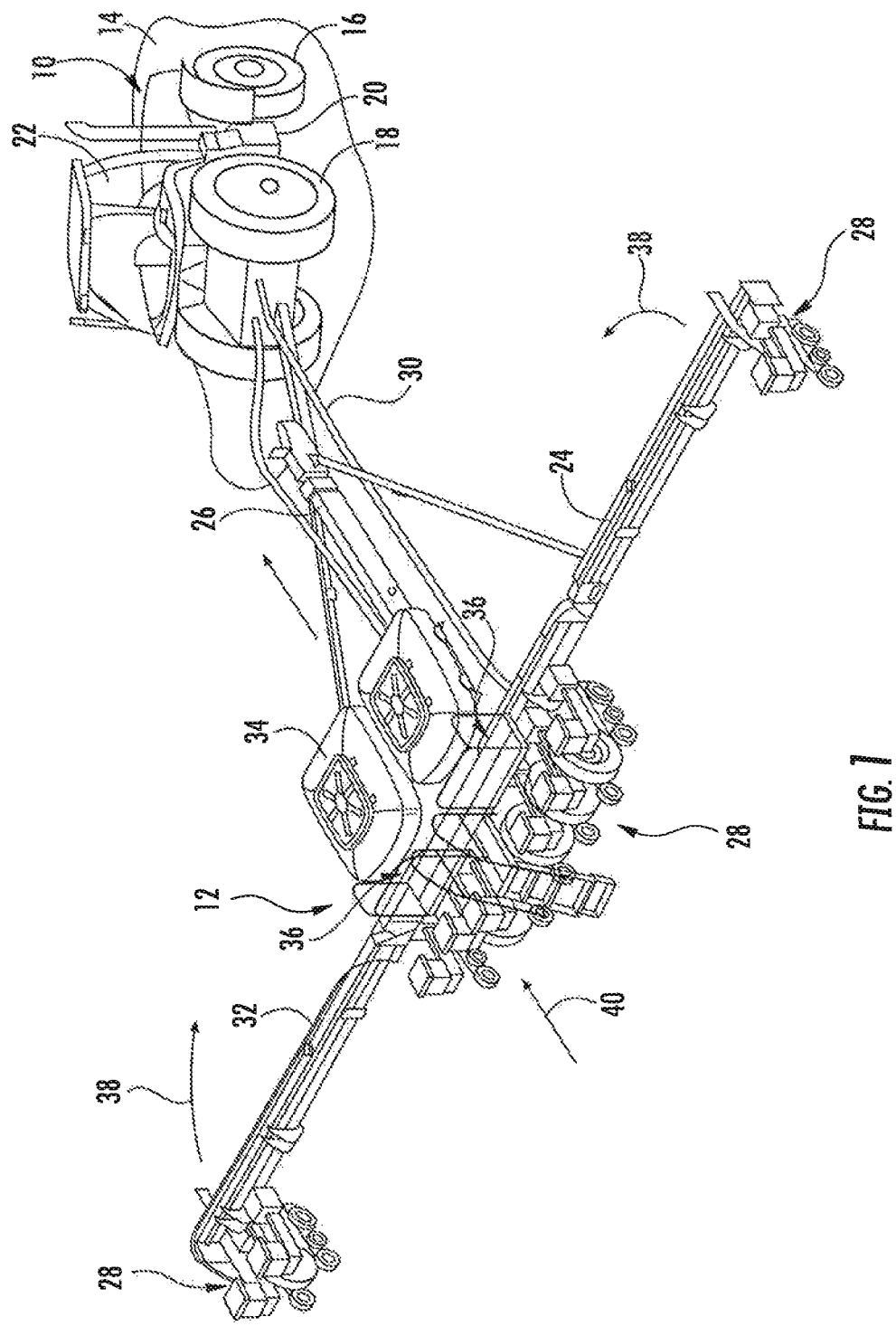
FIG. 1 illustrates a perspective view of one embodiment of a work vehicle towing a planter in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for providing implement-based speed control for a work vehicle via a planter controller of a planter being towed by the work vehicle. Specifically, in several embodiments, the planter controller may be configured to monitor one or more operating parameters that relate to the depth and/or spacing of the seeds being deposited by the various row units of the planter (e.g., a down force parameter(s), a vibration parameter(s), and/or a seed-related parameter(s)) and compare such monitored parameter(s) to one or more associated threshold value(s) (e.g., one or more maximum and/or minimum limits set by the operator). If the row units are performing better than desired based on the comparison between the monitored parameter(s) and the associated threshold value(s), the planter controller may transmit a speed request signal instructing the vehicle's controller to increase the ground speed of the work vehicle. However, if the row units are performing worse than desired based on the comparison between the monitored parameter(s) and the associated threshold value(s), the planter controller may transmit a speed request signal instructing the vehicle's controller to decrease the ground speed of the work vehicle. As such, the vehicle's ground speed may be automatically controlled by the planter controller in a manner that provides for maximized or optimized planting speeds while maintaining the desired operating efficiency and performance for the planter.

It should be appreciated that, although the present subject matter will generally be described herein with reference to planting implements, the disclosed system and method may be advantageously applied to provide implement-based speed control for any suitable type of implement that is configured to dispense or deposit products, including seeders, fertilizer applicators and/or the like. In addition, it should be appreciated that, with the adoption of new technologies like fast acting/automatic hydraulic row unit down force, electric drive vacuum seed meters, and/or electric drive seed delivery systems, the present subject matter may be advantageously applied to provide implement-based speed control across a significantly larger speed range.

Referring now to drawings, FIG. 1 illustrates a perspective view of one embodiment of a work vehicle 10 towing a planter 12 across the ground 14. As shown, the work vehicle 10 is configured as an agricultural tractor. However, in other embodiments, the work vehicle 10 may be configured as any other suitable agricultural vehicle.

As shown in FIG. 1, the work vehicle 10 includes a pair of front wheels (and associated front tires 16), a pair of rear wheels (and associated rear tires 18) and a frame or chassis 20 coupled to and supported by the wheels. An operator's cab 22 may be supported by a portion of the chassis 20 and may house various input devices for permitting an operator to control the operation of one or more components of the work vehicle 10 and/or one or more components of the implement 12. Additionally, as is generally understood, the work vehicle 10 may include an engine and a transmission mounted on the chassis 20. The transmission may be operably coupled to the engine and may provide variably adjusted gear ratios for transferring engine power to the wheels via a drive axle assembly (or via axles if multiple drive axles are employed).

Additionally, as shown in FIG. 1, the planter 12 may include a laterally extending toolbar or frame assembly 24 connected at its middle to a forwardly extending tow bar 26. The frame assembly 24 may generally be configured to support a plurality of seed planting units (or row units) 28. As is generally understood, each row unit 28 may be configured to deposit seeds at a desired depth beneath the soil surface and at a desired seed spacing as the planter 12 is being towed by the work vehicle 10, thereby establishing rows of planted seeds.

It should be appreciated that, for purposes of illustration, only a portion of the row units 28 of the planter 12 have been shown in FIG. 1. In general, the planter 12 may include any number of row units 28, such as 6, 8, 12, 16, 24, 32, or 36 row units. In addition, it should be appreciated that the lateral spacing between row units 28 may be selected based on the type of crop being planted. For example, the row units 28 may be spaced approximately 30 inches from one another for planting corn, and approximately 15 inches from one another for planting soybeans.

In several embodiments, the work vehicle 10 may be configured to supply a working fluid (e.g., hydraulic fluid, air, water) to the planter 12 via one or more fluid lines 30. In such embodiments, one or more motors (e.g., hydraulic motors) of the planter 12 may receive the working fluid from the work vehicle 10 for driving one or more related systems of the planter 12. For example, one or more hydraulic motors may drive a fan and/or a seed drive to direct agricultural material (e.g., seeds, fertilizer, and/or the like) along various supply lines 32 extending between the row units 28 and one or more associated tanks 34 of the planter 12.

Additionally, in several embodiments, the frame assembly 24 of the planter 12 may be adjustable. For instance, the frame assembly 24 may be configured to be folded upwardly from the planting configuration or position shown in FIG. 1 to a transport configuration or position (e.g., via rotation of wings about joints 36) as indicated by arrows 38 in FIG. 1. Similarly, the frame assembly 24 may also be configured to be pivoted so as to align the frame assembly 24 with a direction of travel 40 of the work vehicle 10.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer the work vehicle 10, or rely on tracks in lieu of the tires 16, 18. For instance, the work vehicle 10 may correspond to a "fully tracked" work vehicle having tracks in lieu of both of its front and rear wheels or a "half-tracked" work vehicle having tracks in lieu of its front wheels or its rear wheels.

Similarly, it should also be appreciated that the configuration of the planter 12 described above and shown in FIG. 1 is only provided for exemplary purposes. Thus, it should be appreciated that the present subject matter may be readily adaptable to any manner of planter configuration.

Figure 2:
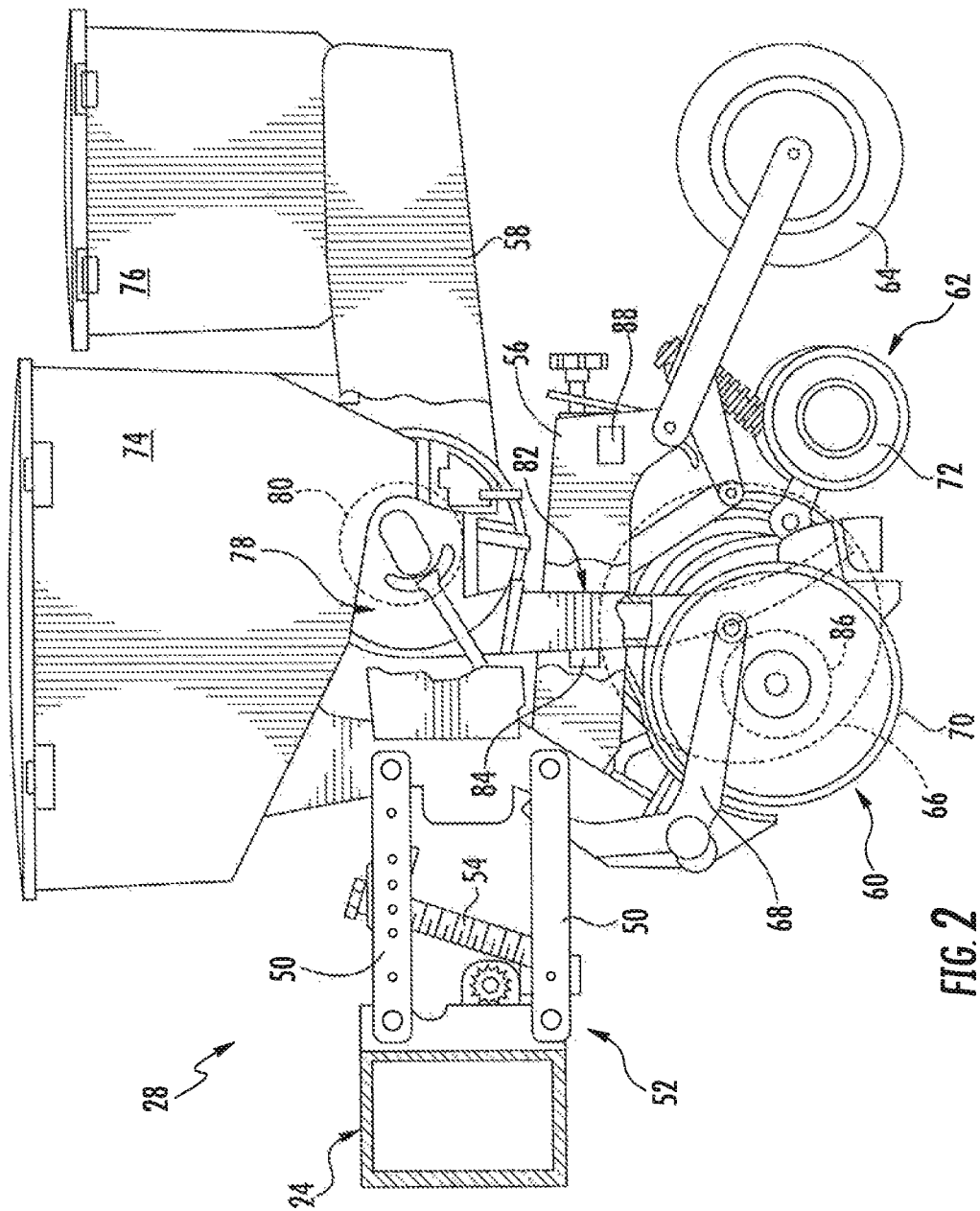
FIG. 2 illustrates a side view of one embodiment of a row unit suitable for use within a planter in accordance with aspects of the present subject matter.

Referring now to FIG. 2, a side view of one embodiment of a row unit 28 is illustrated in accordance with aspects of the present subject matter. As shown, the row unit 28 includes multiple arms 50 of a linkage assembly 52 configured to mount the row unit 28 to the toolbar or frame assembly 24 of the planter 12. As is generally understood, the linkage assembly 52 may be configured to allow vertical movement of each row unit 28 to account for uneven terrain while maintaining a desired down force such that the row unit 28 remains in contact with the ground. Additionally, a biasing member 54 may extend between a mounting bracket (not shown) and a lower arm 50 of the linkage assembly 52 to establish the down force on the row unit 28. In the illustrated embodiment, the biasing member 54 corresponds to a spring configured to exert a constant downward force. In such an embodiment, an adjustment bracket (not shown) may be used to at least partially compress the spring to vary the amount of down force applied by the spring. Alternatively, as will be described below with reference to FIG. 3, the biasing member 54 may correspond to a fluid-driven actuator, such as a pneumatic or hydraulic cylinder. In such an embodiment, the operation of the actuator may be dynamically controlled to vary the down force applied through the row unit 28. Additionally, in several embodiments, a chassis 56 and a frame 58 may be pivotally mounted to the linkage assembly 50, with the chassis 56 and the frame 58 being configured to support the various other components of the row unit 28.

As shown in FIG. 2, the row unit 28 also includes a furrow opening assembly 60, a furrow closing assembly 62, and a press wheel 64. In general, the furrow opening assembly 60 may include a gauge wheel 66 operatively connected to the chassis 56 via an arm 68. Additionally, the opening assembly 60 may also include one or more opening disks 70 configured to excavate a furrow, or trench, in the soil. As is generally understood, the gauge wheel 66 may be configured to engage the surface of the field, with the height of the opening disk(s) 70 being adjusted with respect to the position of the gauge wheel 66 to set the desired depth of the furrow being excavated. Moreover, as shown, the furrow closing assembly 62 may include a closing disk(s) 72 configured to close the furrow after seeds have been deposited into the furrow. The press wheel 64 may then be configured to roll over the closed furrow to firm the soil over the seed and promote favorable seed-to-soil contact.

Additionally, as shown in FIG. 2, the row unit 28 may include a seed hopper 74 and, optionally, a pesticide hopper 76 supported on the frame 58. In general, the seed hopper 74 may be configured to store the seeds to be gravitationally deposited within the furrow as the row unit 28 moves over and across the field. Additionally, as shown in FIG. 2, the row unit 28 may include a seed meter 78 provided in operative association with the seed hopper 74. As is generally understood, the seed meter 78 may be configured to uniformly release seeds received from the seed hopper 74 for deposit within the furrow. For instance, in one embodiment, the seed meter 78 may be coupled to a suitable vacuum source 80 (e.g., a blower powered by a motor and associated tubing or hoses) configured to generate a vacuum or negative pressure that attaches the seeds to a rotating seed disc (not shown) of the seed meter 78, which controls the rate at which the seeds are output from the seed meter 78 to an associated seed tube 82. As shown in FIG. 2, the seed tube 82 may extend vertically between the seed meter 78 and the ground to facilitate delivery of the seeds output from the seed meter 78 to the furrow.

It should be appreciated that, as an alternative to a vacuum seed meter, the seed meter 78 may correspond to any other suitable type of seed meter, such as a pressure or mechanical seed meter. Additionally, in one embodiment, the seed meter 78 may form part of or may be configured as an electric drive vacuum seed meter. Moreover, as an alternative to the gravity drop seed tube 82, the row unit 28 may include an electric drive seed delivery system for delivering seeds to the furrow.

Moreover, in several embodiments, the row unit 28 may include one or more sensors for monitoring one or more associated operating parameters of the row unit 28. For instance, as shown in FIG. 2, the row unit 28 may include one or more seed sensors 84 provided in operative association with the seed tube 82. In one embodiment, the seed sensor(s) 84 may correspond to an optical sensor and/or any other suitable sensor configured to detect seeds dropping through the seed tube 82. As such, the seed sensor(s) 84 may provide an indication of the seed distribution and/or spacing of the seeds as the row unit 28 is actively planting. The row unit 28 may also include one or more down force sensors 86 configured to monitor the down force being applied through the row unit 28, which may be indicative of the current depth and/or spacing at which the seeds are being planted. For instance, the down force sensor(s) 86 may correspond to one or more load sensors (e.g., a load cell(s)) provided in operative association with one or more of the ground-engaging components of the row unit 28, such as the gauge wheel 66. In addition, as shown in FIG. 2, the row unit 28 may include one or more vibration sensor(s) 88 (e.g., an accelerometer(s)) mounted to a given component of the row unit 28 (e.g., a portion of the chassis 56). The vibration sensor(s) 88 may generally be configured to monitor the vibrational motion of the row unit 28 as the planter 12 is being traversed across a field, which may provide an indication of the current spacing and/or depth of the seeds being deposited by the row unit 28. For instance, excessive vibration may result in an uneven distribution of the seeds, increased variations in the depth of the furrow, and/or increased variations in the amount of soil packed over the furrow.

It should be appreciated that the configuration of the row unit 28 described above and shown in FIG. 2 is provided only to place the present subject matter in an exemplary field of use. Thus, it should be appreciated that the present subject matter may be readily adaptable to any manner of seed planting unit configuration.

Figure 3:
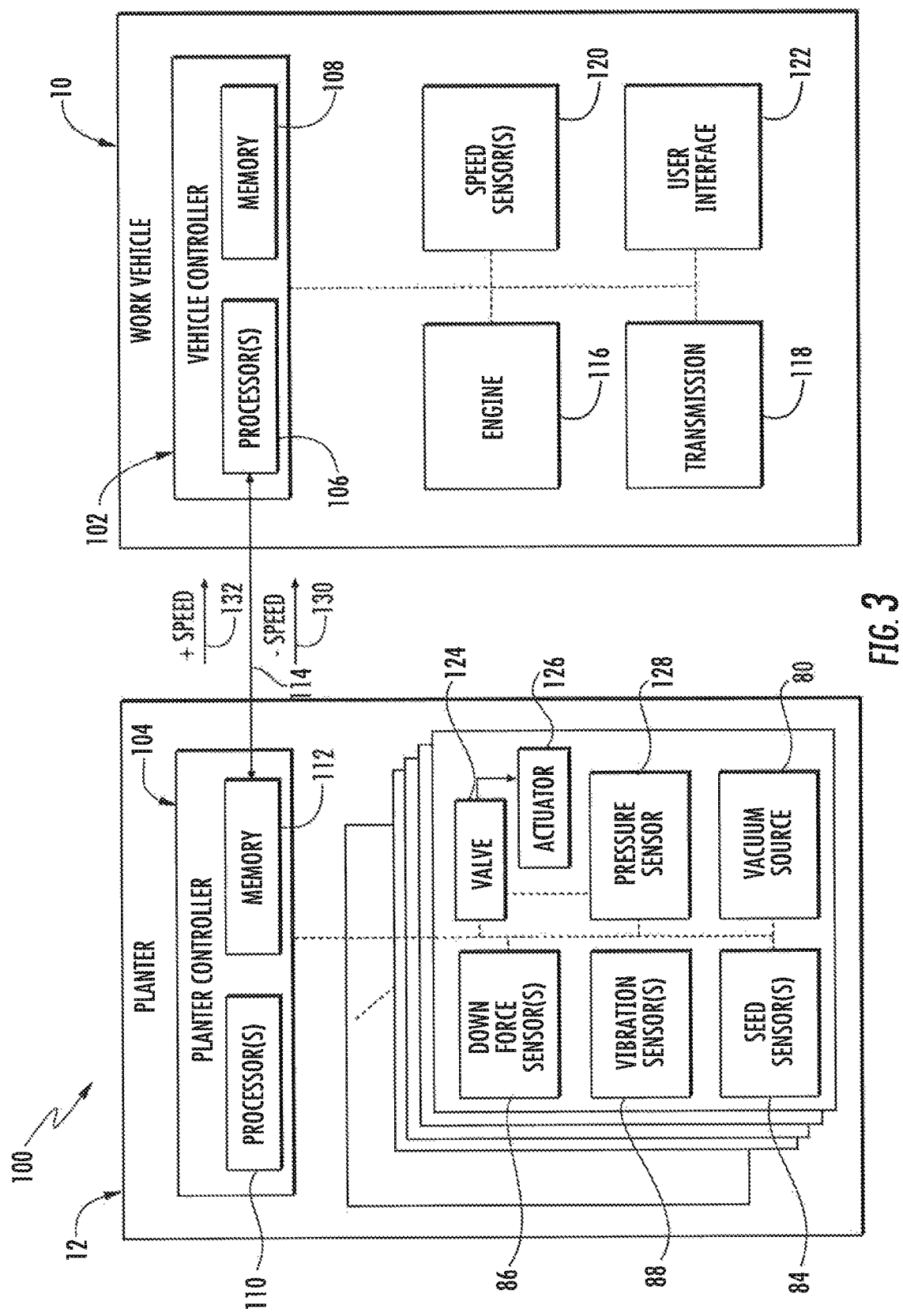
FIG. 3 illustrates a schematic view of one embodiment of a system for providing implement-based speed control for a work vehicle in accordance with aspects of the present subject matter.

Referring now to FIG. 3, a schematic view of one embodiment of a system 100 for providing implement-based speed control for a work vehicle is illustrated in accordance with aspects of the present subject matter. In general, the system 100 will be described herein with reference to the work vehicle 10, the planter 12, and the row unit 28 shown in FIGS. 1 and 2. However, it should be appreciated that the disclosed system 100 may be implemented with work vehicles and/or planters having any other suitable configurations and/or with row units having any other suitable configuration.

As shown, the system 100 may generally include a vehicle controller 102 installed on and/or otherwise provided in operative association with the work vehicle 10 and a planter controller 104 installed on and/or otherwise provided in operative association with the planter 12. In general, each controller 102, 104 of the disclosed system 100 may correspond to any suitable processor-based device(s), such as a computing device or any combination of computing devices. Thus, in several embodiments, the vehicle controller 102 may include one or more processor(s) 106 and associated memory device(s) 108 configured to perform a variety of computer-implemented functions. Similarly, as shown in FIG. 3, the planter controller 104 may also include one or more processor(s) 110 and associated memory devices 112 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 108, 112 of each controller 102, 104 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 108, 112 may generally be configured to store suitable computer-readable instructions that, when implemented by the processor(s) 106, 110, configure each controller 102, 104 to perform various computer-implemented functions, such as one or more aspects of the method 200 described below with reference to FIG. 4 and/or one or more aspects of the control algorithms 300, 400 described below with reference to FIGS. 5-11.

In addition, each controller 102, 104 may also include various other suitable components, such as a communications circuit or module, a network interface, one or more input/output channels, a data/control bus and/or the like, to allow each controller 102, 104 to be communicatively coupled to the other controller and/or to any of the various other system components described herein (e.g., the various sensors 84, 86, 88, etc.). For instance, as shown in FIG. 3, a communicative link or interface 114 (e.g., a data bus) may be provided between the vehicle controller 102 and the planter controller 104 to allow the controllers 102, 104 to communicate with each other via any suitable communications protocol. Specifically, in one embodiment, an ISOBus Class 3 (ISO11783) interface may be utilized to provide a standard communications protocol between the controllers 102, 104. Alternatively, a proprietary communications protocol may be utilized for communications between the vehicle controller 102 and the planter controller 104.

In general, the vehicle controller 102 may be configured to control the operation of one or more components of the work vehicle 10. For instance, in several embodiments, the vehicle controller 102 may be configured to control the operation of an engine 116 and/or a transmission 118 of the work vehicle 10 to adjust the vehicle's ground speed. Specifically, as is generally understood, the vehicle controller 102 may be configured electronically control the operation of the engine 116 by transmitting suitable control signals for controlling an engine or speed governor (not shown) associated with the engine 116. Similarly, the vehicle controller 102 may be configured to control the operation of the transmission 118 by transmitting suitable control signals for controlling the engagement/disengagement of one or more clutches (not shown) provided in operative association with the transmission 118.

Additionally, the vehicle controller 102 may also be communicatively coupled to one or more sensors configured to monitor one or more operating parameters of the work vehicle 10. For instance, as shown in FIG. 3, the vehicle controller 102 may be coupled to one or more speed sensors 120 configured to monitor a speed-related parameter of the work vehicle 10. Specifically, in one embodiment, the speed sensor(s) 120 may allow the vehicle controller 102 to monitor the current ground speed and/or the current wheel speed of the work vehicle 10. In such an embodiment, the speed measurements provided by the speed sensor(s) 120 may be used as feedback by the vehicle controller 102 for controlling the operation of the engine 116 and/or the transmission 118. In addition, as will be described below, the speed measurements may also be transmitted from the vehicle controller 102 to the planter controller 104 (e.g., via the communications interface 114) to allow the planter controller 104 to execute the disclosed methods and/or algorithms for providing implement-based speed control of the work vehicle 10. It should be appreciated that, by monitoring both the ground speed and the wheel speed, the controller(s) 102, 104 may be configured to calculate the current slip ratio for the work vehicle 10 (i.e., the current wheel speed divided by the current ground speed).

Moreover, as shown in the illustrated embodiment, the vehicle controller 102 may be communicatively coupled to a user interface 122 of the work vehicle 10. In general, the user interface 122 may be correspond to any suitable input device(s) configured to allow the operator to provide operator inputs to the vehicle controller 102, such as a touch screen display, a keyboard, joystick, buttons, knobs, switches, and/or combinations thereof located within the cab 22 of the work vehicle 10. As will be described in greater detail below, to execute the implement-based speed control disclosed herein, the operator may be asked to provide various inputs into the system 100 via the user interface 122. The inputs provided by the operator may then be transmitted from the vehicle controller 102 to the planter controller 104 via the communications interface 114 to allow the planter controller 104 to execute the disclosed implement-based speed control. In one embodiment, suitable operator inputs may include, but are not limited to, maximum and minimum ground speed values, one or more down force parameter values (e.g., a minimum ground contact percentage threshold, maximum and minimum down force values, and/or the like), a desired frequency value for adjusting the ground speed, a desired speed change increment value (e.g., a speed change increment for speed reductions and a speed change increment for speed increases), a desired slippage parameter for the work vehicle (e.g., a maximum slip ratio threshold), maximum and minimum vacuum pressures for the seed meter 78, one or more seed-related parameters (e.g., maximum and minimum population values, a minimum singulation value, a maximum seed skip value, a maximum seed multiples value, a minimum seed spacing accuracy value, and/or the like), a desired vibration range for one or more of the row units 28, and/or the like.

Referring still to FIG. 3, the planter controller 104 may generally be configured to control the operation of one or more components of the planter 12. For instance, in several embodiments, the planter controller 104 may be configured to control the operation of one or more components that regulate the down force applied through each row unit 28 and/or one or more components that adjust the operation of the seed meter 78. Specifically, as shown in FIG. 3, in one embodiment, the planter controller 104 may be communicatively coupled to a valve 124 configured to regulate the supply of fluid (e.g., hydraulic fluid or air) to a corresponding down force actuator 126 serving as the biasing member 54 (FIG. 2) for each row unit 28. In such an embodiment, by regulating the supply of fluid to the actuator 126, the planter controller 104 may control the down force applied by the actuator 126 against the row unit 28. For instance, by reducing the pressure of the fluid supplied to the actuator 126, the piston rod (not shown) of the actuator 126 may be retracted, thereby reducing the down force applied through the row unit 28. Similarly, by increasing the pressure of the fluid supplied to the actuator 126, the piston rod may be extended, thereby increasing the down force applied through the row unit 28. Moreover, as shown in FIG. 3, the planter controller 104 may be communicatively coupled to the vacuum source 80 of each row unit 28 for controlling the negative pressure provided within the seed meter 78 to regulate the rate at which the seeds are expelled from the meter 78 into the seed tube 82. For example, the planter controller 104 may be configured to control the vacuum source 80 so as to increase the negative pressure applied within the seed meter 78 when it is desired to reduce the occurrence of skipped seeds in the meter 78 and decrease the negative pressure applied within the seed meter 78 when it is desired to decrease the occurrence of multiple seeds.

Additionally, the planter controller 104 may also be communicatively coupled to the various sensors associated with each row unit 28. For instance, as shown in FIG. 3, the planter controller 104 may be coupled to the down force sensor(s) 86 configured to monitor the down force being applied through the row unit 28. As indicated above, in one embodiment, the down force sensor(s) 86 may correspond to one or more load sensor(s) provided in operative association with one or more of the ground engaging components of the row unit 28. Alternatively, the down force sensor(s) 86 may correspond to one or more pressure sensor(s) 128 configured to monitor the pressure of the fluid being supplied to the actuator 126, thereby providing an indication of the down force being applied through the row unit 28.

Further, as shown in FIG. 3, the planter controller 104 may also be communicatively coupled to various other sensors, such as the seed sensor(s) 84 and the vibration sensor(s) 88 of each row unit 28. As indicated above, the seed sensor(s) 84 may be configured to detect each seed falling through the seed tube 82, thereby providing an indication of the output rate of the seed meter 78. Similarly, the vibration sensor(s) 88 may be configured to monitor the vibrational motion of the row unit 28 as its being traversed across the ground. For instance, as indicated above, the vibration sensor(s) 88 may correspond to an accelerometer configured to detect the magnitude of the vibration or bouncing of the row unit 28 on which it is installed.

As indicated above, in accordance with aspects of the present subject matter, the planter controller 104 may be configured to provide implement-based control of the ground speed of the work vehicle 10. Specifically, in several embodiments, the planter controller 104 may be configured to receive one or more planter control inputs from the vehicle controller 102 (e.g., operator inputs provided via the user interface 122 and/or default values pre-stored within the vehicle controller 102) that include at least one threshold value defined for an operating parameter that is associated with the depth and/or spacing of the seeds being deposited by the various row units 28. For instance, in one embodiment, the planter control input(s) may correspond to a threshold value(s) for a down force parameter of one or more of the row units 28 (e.g., a minimum ground contact percentage threshold value and/or a desired down force range), a threshold value(s) for the vibrational motion of one or more of the row units 28 (e.g., a desired vibration range and/or a maximum average vibration), and/or a threshold value(s) for a seed-related parameter of one or more of the row units 28 (e.g., a desired population range, a minimum singulation value, a maximum seed skips value, and/or a maximum seed multiples value). In such an embodiment, the planter controller 104 may be configured to monitor the relevant operating parameter(s) (e.g., via the related sensor (s)) and compare such monitored value(s) to the associated threshold value(s). In the event that the monitored value(s) is less or worse than the associated threshold value(s) (i.e., meaning that the row unit(s) 28 is performing worse than desired), the planter controller 104 may be configured to transmit a speed request signal (indicated by arrow 130 in FIG. 3) to the vehicle controller 102 instructing the vehicle controller 102 to reduce the current ground speed of the work vehicle 10. Similarly, in the event that the monitored value(s) is greater or better than the associated threshold value(s) (i.e., meaning that the row unit(s) 28 is performing better than desired), the planter controller 104 may be configured to transmit a speed request signal (indicated by arrow 132 in FIG. 3) to the vehicle controller 102 instructing the controller 102 to increase the current ground speed of the work vehicle 10. Thus, the planter controller 104 may be configured to transmit speed request signals 130, 132 so as to maximize the ground speed without sacrificing planter performance. Based on the speed request signal 130, 132, the vehicle controller 102 may then control the operation of the engine 16 and/or transmission 118 in a manner that increases or decreases the ground speed of the work vehicle 10 as requested by the planter controller 102.

It should be appreciated that, in several embodiments, the planter controller 104 may be configured to apply one or more operator-selected settings (or system default settings) when transmitting the speed request signal(s) 130, 132 to execute the disclosed implement-based speed control. For instance, minimum and maximum speed values may be set for the work vehicle 10 that serve as minimum and maximum ground speeds that can be requested by the planter controller 104. Similarly, one or more setting may be applied that relate to the time-based frequency at which speed adjustments may be requested by the planter controller 104 and/or the magnitude by which the current ground speed may be adjusted by the planter controller 104 up or down within each frequency interval. Moreover, a slip parameter setting(s) may also be applied by the planter controller 104 to ensure that increases in the ground speed are not requested when the work vehicle 10 is operating at or above a given slip-related threshold.

Figure 4:
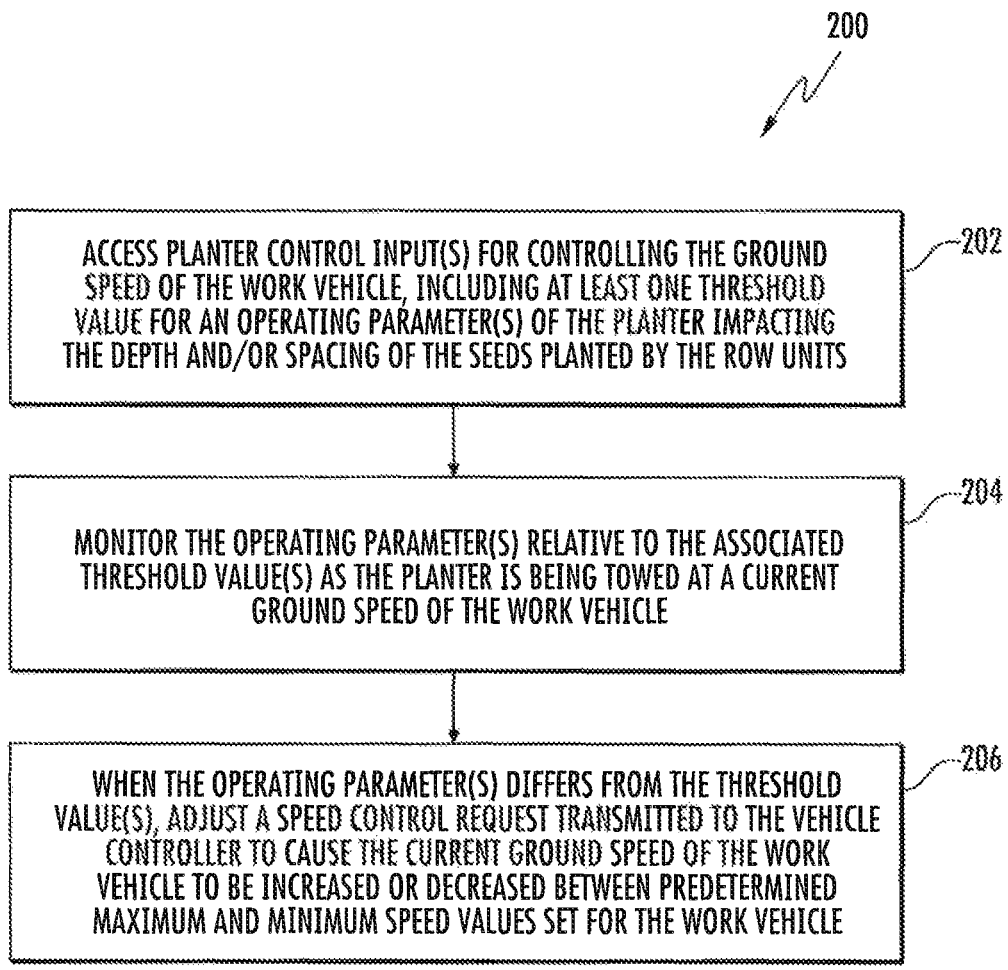
FIG. 4 illustrates a flow diagram of one embodiment of a method for providing implement-based speed control for a work vehicle in accordance with aspects of the present subject matter.

Referring now to FIG. 4, a flow diagram of one embodiment of a method 200 for providing implement-based speed control for a work vehicle is illustrated in accordance with aspects of the present subject matter. In general, the method 200 will be described herein with reference to the work vehicle 10, the planter 12, and the row unit 28 shown in FIGS. 1 and 2, as well as the various system components shown in FIG. 3. However, it should be appreciated that the disclosed method 200 may be implemented with work vehicles, planters, and/or row units having any other suitable configurations and/or within systems having any other suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As indicated above, various aspects of the disclosed method 200 may be configured to be executed by the planter controller 104 to allow the controller 104 to transmit speed control requests for controlling the ground speed of the work vehicle 10. As such, the vehicle's ground speed may be automatically controlled by the planter controller 104 in a manner that provides for increased or optimized planting speeds while maintaining the desired operating efficiency for the planter 12. For instance, if the active row units 28 are currently operating better than desired, the planter controller 104 may be configured to request that the ground speed of the work vehicle 10 be increased to provide improved planter productivity.

As shown in FIG. 4, at (202), the method 200 may include accessing one or more planter control inputs associated with controlling the ground speed of the work vehicle. Specifically, as indicated above, the planter controller 104 may be configured to receive various planter control inputs from the vehicle controller 102, which may include operator inputs provided by the operator via the user interface 122 and/or default settings stored within the vehicle controller 102. Alternatively, the planter control inputs may be pre-stored within the planter controller 104. In one embodiment, at least one of the planter control inputs may correspond to at least one threshold value for an operating parameter(s) of the planter 12 that is associated with the depth and/or spacing of the seeds being deposited by the row units 28. For instance, as indicated above, such operating parameter(s) may, in one embodiment, correspond to a down force parameter for the row units 28, a vibration parameter for the row units 28 and/or a seed-related parameter for the row units 28. Additionally, the planter control inputs may also include any other suitable parameters and/or settings to be used by the planter controller 104 in determining when and to what extent to adjust the ground speed of the work vehicle 10, such as minimum and maximum ground speed values for the work vehicle 10, a time-based frequency value(s) and/or a speed change increment value(s) for adjusting the ground speed, slippage parameter threshold value(s), and/or the like.

Moreover, as shown in FIG. 4, at (204), the method 200 may include monitoring the operating parameter(s) relative to the associated threshold value(s) as the planter is being towed at a current ground speed of the work vehicle. For instance, if the operating parameter(s) corresponds to a down force parameter and the threshold value(s) corresponds to a desired down force range for a given row unit 28 (or an average down force range for the various active row units 28), the planter controller 104 may be configured to monitor the current down force for each relevant row unit(s) 28 (e.g., via the down force sensor(s) 86) and compare the monitored down force value to the maximum and minimum values associated with the relevant down force range. Similarly, if the operating parameter(s) corresponds to a vibration parameter and the threshold value(s) corresponds to a maximum vibration threshold for a given row unit 28 (or a maximum average vibration threshold for the various active row units 28), the planter controller 104 may be configured to monitor the current vibrational motion for each relevant row unit(s) 28 (e.g., via the vibration sensor(s) 88) and compare the monitored vibration value to the maximum threshold value(s). As another example, if the operating parameter(s) corresponds to a seed-related parameter and the threshold value(s) corresponds to a desired seed population range for the various active row units 28, the planter controller 104 may be configured to monitor the current seed distribution for the relevant row unit(s) 28 (e.g., via the seed sensor(s) 84) and compare the monitored seed distribution value to the maximum and minimum values associated with the seed population range.

Referring still to FIG. 4, at (206), the method 200 may include adjusting a speed control request transmitted to the vehicle controller to cause the current ground speed to be increased or decreased between predetermined maximum and minimum speed values for the work vehicle when the operating parameter(s) differs from the threshold value(s). For instance, if the threshold value(s) corresponds to a minimum threshold value(s), the planter controller 104 may be configured to adjust the speed control request transmitted to the vehicle controller 102 to adjust the ground speed of the work vehicle 10 when the monitored parameter falls below the minimum threshold (and/or when the monitored parameter exceeds the minimum threshold by a given tolerance amount). Similarly, if the threshold value(s) corresponds to a maximum threshold value(s), the planter controller 104 may be configured to change the speed control request transmitted to the vehicle controller 102 to adjust the ground speed of the work vehicle 10 when the monitored parameter exceeds the maximum threshold (and/or when the monitored parameter falls below the maximum threshold by a given tolerance amount). As another example, if the threshold value(s) corresponds to a predetermined range of values, the planter controller 104 may be configured to adjust the speed control request transmitted to the vehicle controller 102 to adjust the ground speed of the work vehicle 10 when the monitored parameter falls outside the predetermined range. As indicated above, the speed control request transmitted by the planter controller 104 may, for example, instruct the vehicle controller 102 to either increase or decrease the ground speed of the work vehicle 10 depending on whether the difference between the monitored operating parameter(s) and the associated threshold value(s) is indicative of the row unit(s) 28 performing better than desired (e.g., due, at least in part, to the work vehicle 10 traveling too slow) or performing worse than desired (e.g., due, at least in part, to the work vehicle 10 traveling too fast).

Figure 5:
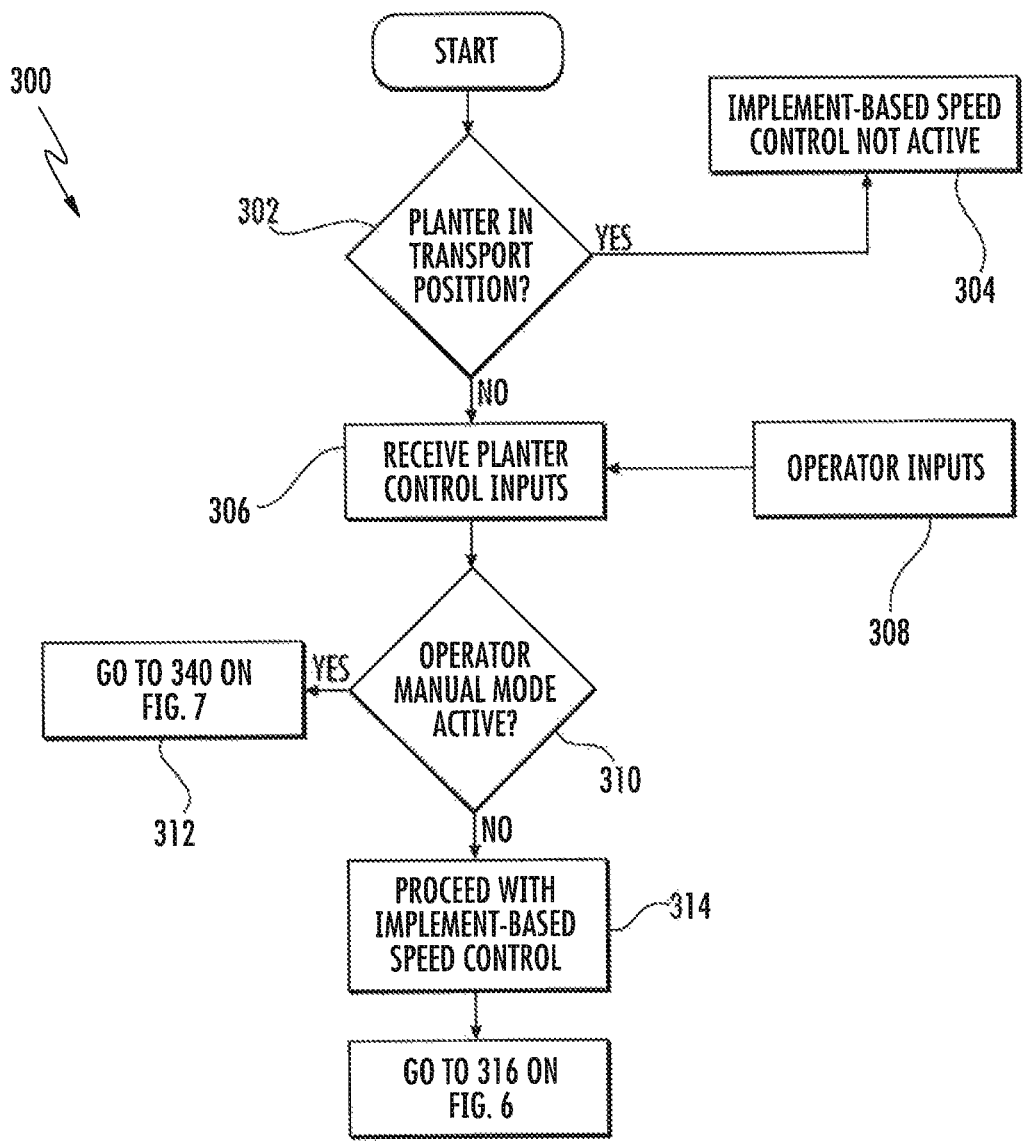
FIG. 5 illustrates a flow diagram of a control algorithm representing a specific implementation of the method shown in FIG. 4 in accordance with aspects of the present subject matter.
Figure 6:
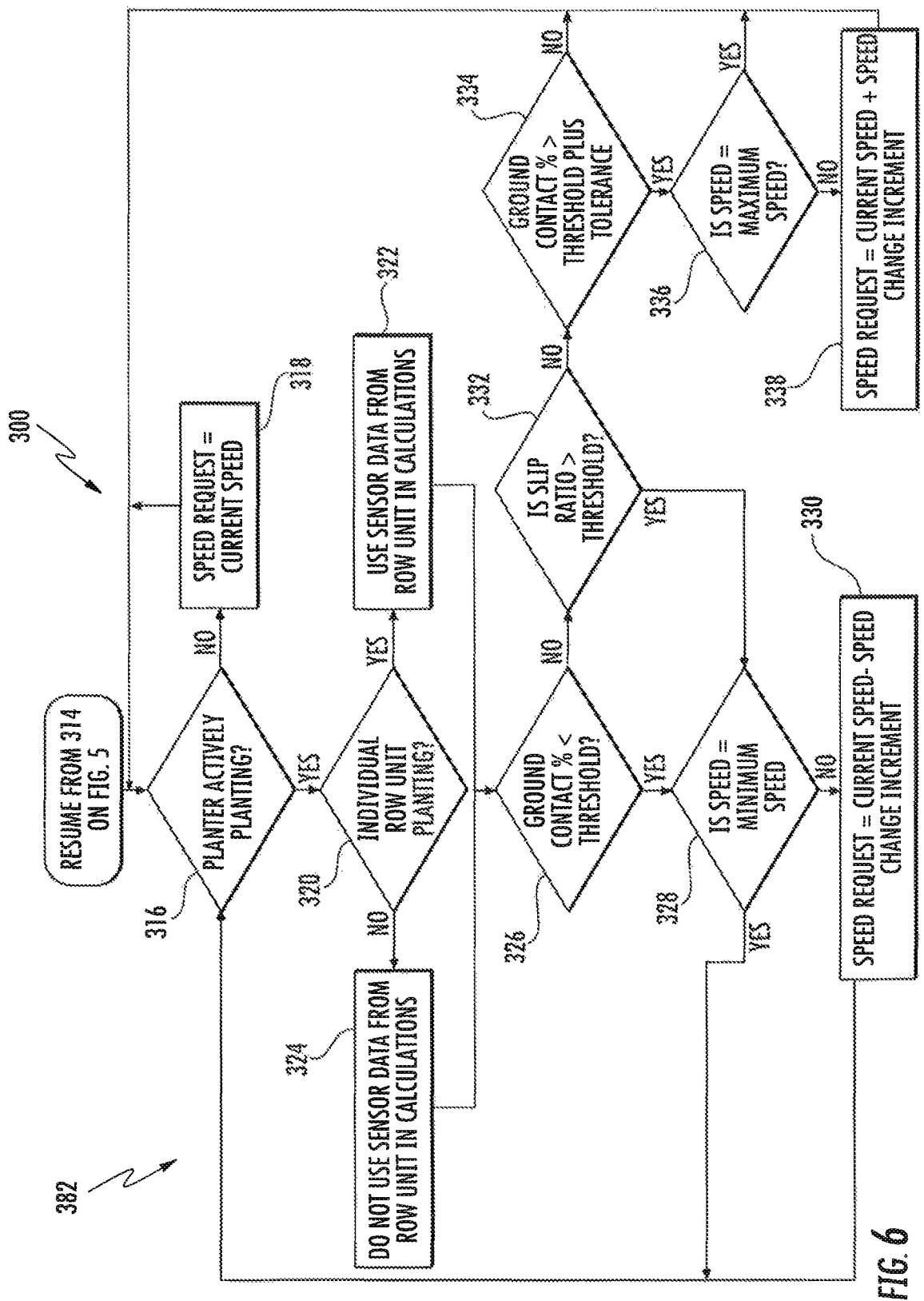
FIG. 6 illustrates a flow diagram showing another section of the control algorithm shown in FIG. 5.
Figure 7:
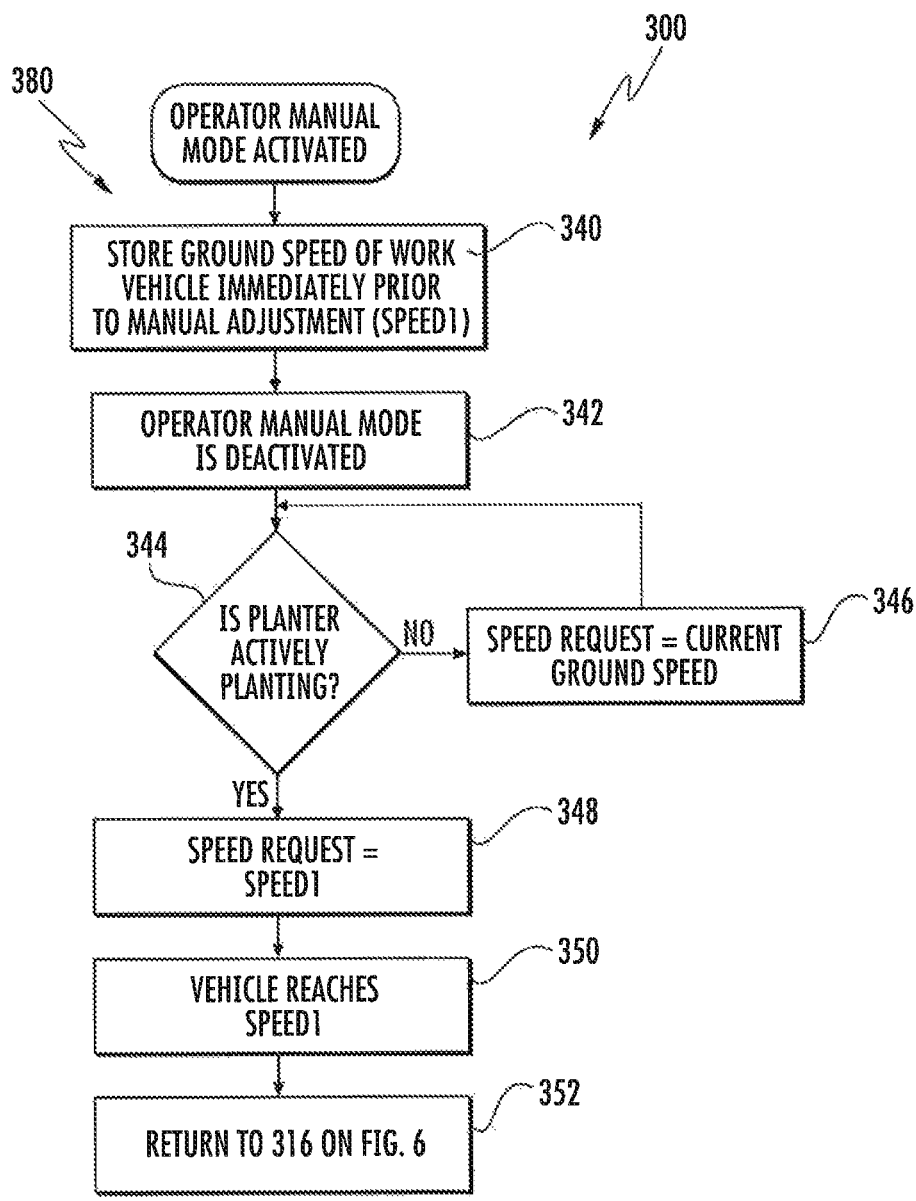
FIG. 7 illustrates a flow diagram showing a further section of the control algorithm shown in FIG. 5.

Referring now to FIGS. 5-7, a flow diagram of a control algorithm 300 providing a specific embodiment or implementation of the method 200 described above with reference to FIG. 4 is illustrated in accordance with aspects of the present subject matter. In particular, the control algorithm 300 relates to an embodiment in which the planter controller 104 is configured to monitor a down force parameter of one or more of the row units 28 (e.g., the ground contact percentage of the row unit(s) 28) and compare the monitored parameter to a corresponding threshold value (e.g., a minimum ground contact percentage). However, in other embodiments, a similar control methodology may be used by the planter controller 104 based on any other suitable operating parameter(s) for the row units 28. In addition, although FIGS. 5-7 depicts steps performed in a particular order for purposes of illustration and discussion, the control algorithm 300 is not limited to any particular order or arrangement. One skilled in the art, using the disclosures provided herein, will appreciate that various steps of the control algorithm 300 can be omitted, rearranged, combined, and/or adapted in various ways without deviating from the scope of the present disclosure.

As shown in FIG. 5, upon initiation of the control algorithm 300, the planter controller 104 may, at (302), determine whether the planter 12 is currently in its raised or transport position. If the planter 12 is currently at its transport position, the implement-based speed control disclosed herein is not intended to be active and, thus, the control algorithm 300 may be terminated (e.g., at (304)). However, if the planter 12 is not currently at its transport position (e.g., the planter 12 is at its lowered or planting position), the planter controller 104 may, at (306), receive one or more planter control inputs. As indicated above, in one embodiment, the planter control inputs may correspond to one or more operator inputs (e.g., as indicated at 308) provided by the operator via the user interface 122 of the work vehicle 10. However, in the event that the operator has not provided such inputs, the planter control input(s) may correspond to one or more default settings pre-stored within the vehicle controller 102 and/or the planter controller 104. As will be described below, suitable planter control inputs for implementing the control algorithm 300 shown in FIGS. 5-7 may include, but are not limited to, maximum and minimum ground speed values, a minimum ground contact percentage threshold, a time-based frequency value for speed adjustments, a speed change increment value, and/or a maximum slip ratio. However, in other embodiments, the planter control inputs may include any other suitable relevant operating parameters and/or settings.

Following receipt of the planter control inputs, the planter controller 104 may, at (310), determine whether an Operator Manual Mode is currently activated. If so, the planter controller 104 may, at (312), be configured to execute one embodiment of a sub-algorithm 380 associated with such operating mode, as will be described below with reference to FIG. 7. However, if the Operator Manual Mode is not currently active, the planter controller 104 may, at (314), be configured to execute one embodiment of a sub-algorithm 382 associated with the disclosed implement-based speed control, as will be described below with reference to FIG. 6.

As shown in FIG. 6, when executing the sub-algorithm 382, the planter controller 104 may, at (316), determine whether the planter 12 is actively planting seeds. In the event that none of the row units 28 are currently planting seeds, the planter controller 104 need not make any adjustments to the ground speed of the work vehicle 10. Thus, as shown in FIG. 6, at (318), the planter controller 104 may transmit a speed control request to the vehicle controller 102 indicating that the ground speed of the work vehicle 10 should be maintained at the current ground speed (or the planter controller 104 may be configured to simply skip transmitting a speed request for the current interval). However, if the planter 12 is currently being used to plant seeds, the planter controller 104 may, at (320), determine which of the rows units 28 of the planter 12 are currently active. Specifically, for each row unit 28, the planter controller 104 may determine whether the subject row unit 28 is actively planting seeds. If the row unit 28 is actively planting seeds, the planter controller 104 may indicate (e.g., at box 322) that the sensor data from such row unit 28 may be used for making one or more calculations associated with implementation of the disclosed algorithm 300. Similarly, if the row unit 28 is not actively planting seeds, the planter controller 104 may indicate (e.g., at box 324) that the sensor data from such row unit 28 will not be used for making one or more calculations associated with implementation of the disclosed algorithm 300

Using the sensor data from the active row units 28, the planter controller 104 may, at (326), compare the current ground contact percentage (e.g., the ground contact percentage for each active row unit 28 or an average ground contact percentage for all of the active row units 28) to a minimum ground contact percentage threshold set for the planter 12. As is generally understood, the ground contact percentage for one or more of the row units 28 may be estimated or calculated based on sensor data collection from such row unit(s) 28, such as sensor data from the down force sensor(s) 86 and/or the vibration sensor(s) 88. If the current ground contact percentage is less than the minimum ground contact percentage threshold, the planter controller 104 may, at (328), determine whether the current ground speed is equal to the minimum ground speed value set for the work vehicle 10. For instance, as indicated above, the vehicle controller 102 may be configured to continuously transmit speed signals to the planter controller 104 associated with the current ground speed of the work vehicle 10 (e.g., as monitored by the vehicle controller 102 via the speed sensor(s) 120). If the current ground speed is equal to the minimum ground speed value, the control algorithm 300 may be looped back to flow step 316 without changing the current ground speed request transmitted to the vehicle controller 102. However, if the current ground speed is greater than the minimum speed value, the planter controller 104 may, at (330), change the speed request signal transmitted to the vehicle controller 102 to indicate that the current ground speed of the work vehicle 10 should be reduced to a new speed corresponding to the current ground speed less a given speed change increment value set for the planter 12. For instance, if the speed change increment value is 1 mile-per-hour (MPH) for speed reductions, the planter controller 104 may be configured to transmit a speed control request to the vehicle controller 102 indicating that the current ground speed of the work vehicle 10 should be reduced by 1 MPH. Thereafter, the control algorithm 300 may be looped back to flow step 316, As shown in FIG. 6, if the current ground contact percentage is, instead, greater than or equal to the minimum ground contact percentage threshold, the planter controller 104 may, at (332), evaluate the current slip ratio of the work vehicle 10 relative to a slip ratio threshold set for the work vehicle 10. If the current slip ratio is greater than the slip ratio threshold (thereby indicating that the wheels are slipping more than desired), the control algorithm 300 may move to flow step 328 to determine if the current ground speed can be reduced. However, if the current slip ratio is less than the slip ratio threshold (thereby indicating that the wheels are not slipping more than desired), the planter controller 104 may, at (334), determine whether the current ground contact percentage is greater than the minimum ground contact percentage threshold by a given tolerance value (e.g., 1% or 2%). If the current ground contact percentage is not greater than the sum of the minimum ground contact percentage threshold and the relevant tolerance value, the control algorithm 300 may be looped back to flow step 316 without changing the speed request signal being transmitted to the vehicle controller 102. Alternatively, if the current ground contact percentage is greater than the sum of the minimum ground contact percentage threshold and the relevant tolerance value, the planter controller 104 may, at (336) determine whether the current ground speed is equal to the maximum ground speed value set for the work vehicle 10. If the current ground speed is equal to the maximum ground speed value, the control algorithm 300 may be looped back to flow step 316 without changing the speed request signal being transmitted to the vehicle controller 102. However, if the current ground speed is less than the maximum speed value, the planter controller 104 may, at (338), change the speed control request transmitted to the vehicle controller 102 to indicate that the current ground speed of the work vehicle 10 should be increased to a new speed corresponding to the sum of the current ground speed plus a given speed change increment value set for the planter 12. For instance, if the speed change increment value is 0.5 MPH for speed increases, the planter controller 104 may be configured to transmit a speed control request to the vehicle controller 102 indicating that the current ground speed of the work vehicle 10 should be increased by 0.5 MPH.

Referring now to FIG. 7, the sub-algorithm 380 associated with the Operator Manual Mode will now be described. As shown, when the Operator Manual Mode is activated by the operator manually changing the ground speed of the work vehicle 10, the planter controller may, at (340), store the ground speed of the work vehicle 10 prior to the manual adjustment as an archived speed setting (e.g., SPEED1). During the Operator Manual Mode, the operator may manually adjust the ground speed of the work vehicle 10 (e.g., using one or more of the input devices housed within the cab 22 of the work vehicle 10). Thereafter, when the Operator Manual Mode is terminated and the operator desires to resume the above-described implement-based speed control mode (e.g., at flow step 342), the planter controller 104 may, at (344), determine whether any of the row units 28 are actively planting seeds. If not, the planter controller 104 may, at (346), transmit a speed request signal to the vehicle controller 102 indicating that the ground speed of the work vehicle 10 should be maintained at the current ground speed. However, if one or more of the row units 28 are actively planting seeds, the planter controller 104 may, at (348), change speed request signal transmitted to the vehicle controller 102 to indicate that the ground speed of the work vehicle 10 should be adjusted (up or down as the case may be) to the archived speed setting corresponding to the ground speed at which the work vehicle 10 was operating when the Operator Manual Mode was initially activated (e.g., SPEED1). Once the ground speed of the work vehicle 10 is adjusted to the archived speed setting (e.g., at 350), the algorithm 300 may, at (352), transition back to the sub-algorithm 382 shown in FIG. 6 associated with above-described implement-based speed control.

It should be appreciated that the Operator Manual Mode may be utilized, for example, when the planter 12 reaches the end of the field. For instance, the operator may desire to adjust the current ground speed of the work vehicle 10 (e.g., by reducing the ground speed) when turning around to make another pass across the field. In such instance, the sub-algorithm 380 may be implemented to accommodate manual control of the ground speed and to allow implement-based speed control to be reinitiated following such operator-initiated manual control.

Referring now to FIGS. 8-11, a flow diagram of another control algorithm 400 providing a specific embodiment or implementation of the method 200 described above with reference to FIG. 4 is illustrated in accordance with aspects of the present subject matter. In particular, the control algorithm 400 relates to an embodiment in which the planter controller 104 is configured to monitor various operating parameters of one or more of the row units 28 (e.g., one or more seed-related parameters and one or more down force parameters), adjust the monitored operating parameters as needed, and compare the monitored parameters to corresponding threshold values for adjusting the ground speed of the work vehicle. It should be appreciated that, although FIGS. 8-11 depict steps performed in a particular order for purposes of illustration and discussion, the control algorithm 400 is not limited to any particular order or arrangement. One skilled in the art, using the disclosures provided herein, will appreciate that various steps of the control algorithm 400 can be omitted, rearranged, combined, and/or adapted in various ways without deviating from the scope of the present disclosure.

Figure 8:
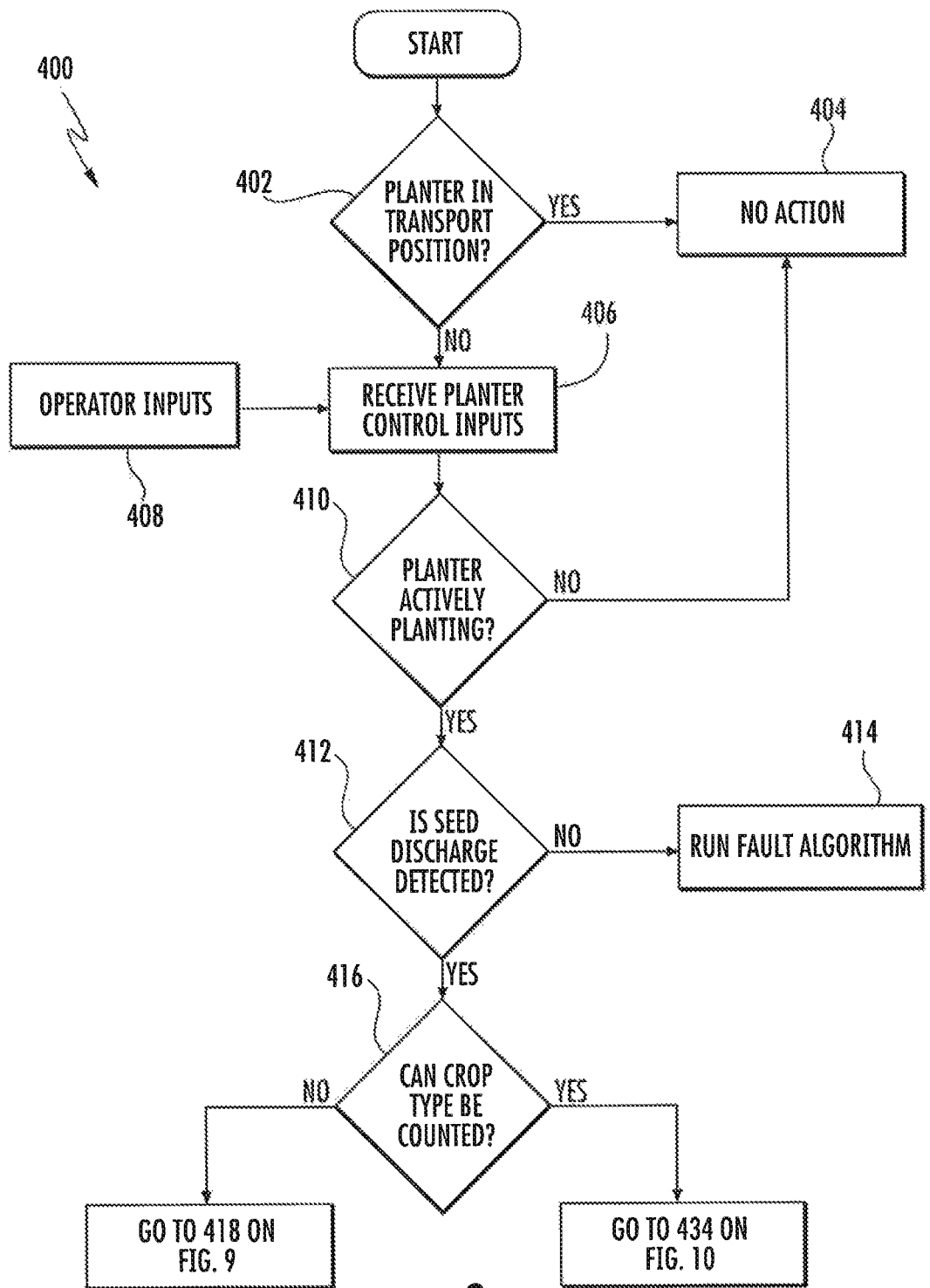
FIG. 8 illustrates a flow diagram of a control algorithm representing another specific implementation of the method shown in FIG. 4 in accordance with aspects of the present subject matter.

As shown in FIG. 8, upon initiation of the control algorithm 400, the planter controller 104 may, at (402), determine whether the planter 12 is currently in its raised or transport position. If the planter 12 is currently at its transport position, the implement-based speed control disclosed herein is not intended to be active and, thus, the control algorithm 400 may be terminated (e.g., at (404)). However, if the planter 12 is not currently at its transport position (e.g., the planter 12 is at its lowered or planting position), the planter controller 104 may, at (406), receive one or more planter control inputs, such as one or more operator inputs (e.g., as indicated at 408). As will be described below, suitable planter control inputs for implementing the control algorithm shown in FIGS. 8-11 may include, but are not limited to, maximum and minimum ground speed values, a desired seed population range, a desired seed singulation threshold, a desired vibration range, a time-based frequency value for speed adjustments, and/or a speed change increment value. However, in other embodiments, the planter control inputs may include any other suitable relevant operating parameters and/or settings.

Following receipt of the planter control inputs, the planter controller 104 may, at (410), determine whether the planter 12 is actively planting seeds. In the event that none of the row units 28 are currently planting seeds, the planter controller 104 need not make any adjustments to the ground speed of the work vehicle 10 and, thus, the control algorithm 400 may be terminated (e.g., at (404)). However, if the planter 12 is currently being used to plant seeds, the planter controller 104 may, at (412), determine whether seed discharges are currently being detected for the active row units 28 (e.g., via the associated seed sensors 84). If seed discharges are not currently being detected for one or more of the active row units 28, the planter controller may, at (414), execute any suitable fault algorithms stored within its memory. Alternatively, if seed discharges for the active row units 28 are currently being detected, the planter controller 104 may, at (416), determine whether the crop being planted corresponds to a crop type that can be counted. If the crop type cannot be counted, the control algorithm 400 may move to flow step 418 shown in FIG. 9. However, if the crop type can be counted, the control algorithm 400 may move to flow step 434 shown in FIG. 10.

Figure 9:
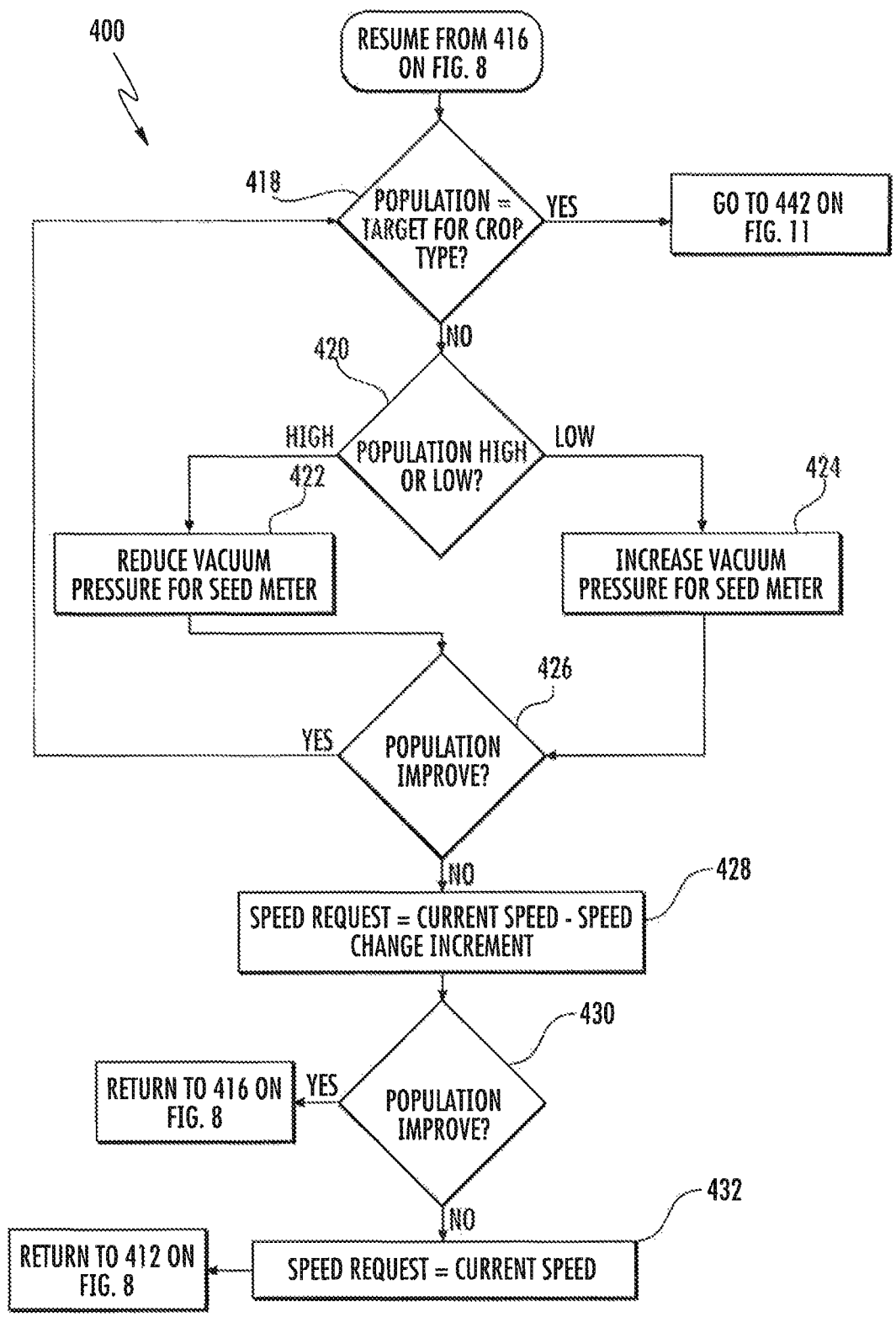
FIG. 9 illustrates a flow diagram showing another section of the control algorithm shown in FIG. 8.

As shown in FIG. 9, when the crop type cannot be counted, the planter controller 104 may, at (418), determine whether the current seed population (e.g. as monitored via the seed sensors 84) is equal to a desired seed population target set for the planter 12. If the current seed population is equal to the desired seed population target, the control algorithm 400 may move to flow step 442 shown in FIG. 11. However, if the current seed population is not equal to the desired seed population target, the planter controller 104 may, at (420), determine whether the current seed population is higher or lower than the desired seed population target. If the current seed population is too high, the planter controller 104 may, at (422), reduce the vacuum pressure within the seed meter 78 (e.g., by adjusting the operation of the associated vacuum source 80). Similarly, if the current seed population is too low, the planter controller 104 may, at (424), increase the vacuum pressure within the seed meter 78 (e.g., by adjusting the operation of the associated vacuum source 80).

Following the increase or reduction in the vacuum pressure, the planter controller 104 may, at (426), determine whether the pressure adjustment resulted in an improvement to the monitored seed population. If so, the control algorithm 400 may return back to flow step 418. However, if the pressure adjustment did not result in an improvement to the monitored seed population, the planter controller 104 may, at (428), change the speed request signal transmitted to the vehicle controller 102 to indicate that the current ground speed of the work vehicle 10 should be reduced to a new speed corresponding to the current ground speed less a given speed change increment value set for the planter 12. For instance, if the speed change increment value is 1 mile-per-hour (MPH) for speed reductions, the planter controller 104 may be configured to transmit a speed control request to the vehicle controller 102 indicating that the current ground speed of the work vehicle 10 should be reduced by 1 MPH. In addition, the planter controller 104 may also be configured to re-set the vacuum pressure for the seed meter 78 to its previous pressure setting. Thereafter, the planter controller 104 may, at (430), again check the current seed population to see if the reduction in ground speed has resulted in an improvement to the seed population. If so, the control algorithm 400 may return back to flow step 416 shown in FIG. 8. However, if the reduction in ground speed did not result in an improvement to the monitored seed population, the planter controller 104 may, at (432), change the speed request signal transmitted to the vehicle controller 102 to indicate that the ground speed of the work vehicle 10 should be maintained at its current value. The control algorithm 400 may then return back to flow step 412 shown in FIG. 8.

Figure 10:
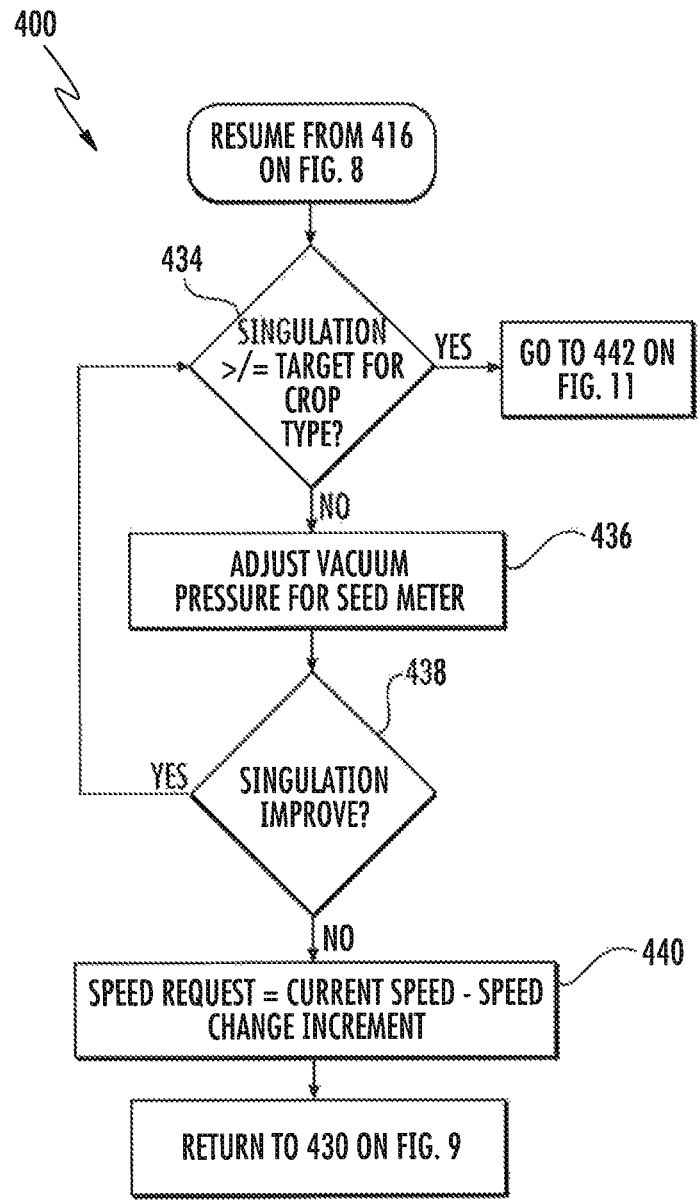
FIG. 10 illustrates a flow diagram showing a further section continuation of the control algorithm shown in FIG. 8.

Referring now to FIG. 10, when the crop type can be counted, the planter controller 104 may, at (434), determine whether the current seed singulation (e.g. as monitored via the seed sensors 84) is greater than or equal to a desired seed singulation threshold set for the planter 12. If the current seed singulation is greater than or equal to the desired seed singulation threshold, the control algorithm 400 may move to flow step 442 shown in FIG. 1. However, if the current seed singulation is less than the desired seed singulation threshold, the planter controller 104 may, at (436), adjust the vacuum pressure within the seed meter 78 (e.g., by adjusting the operation of the associated vacuum source 80).

Following the vacuum pressure adjustment, the planter controller 104 may, at (438), determine whether the pressure adjustment resulted in an improvement to the current seed singulation. If so, the control algorithm 400 may return back to flow step 434. However, if the pressure adjustment did not result in an improvement to the current seed singulation, the planter controller 104 may, at (440), change the speed request signal transmitted to the vehicle controller 102 to indicate that the current ground speed of the work vehicle 10 should be reduced to a new speed corresponding the current ground speed less a given speed change increment value set for the planter 12. In addition, the planter controller 104 may be configured to re-set the vacuum pressure for the seed meter 78 to its previous pressure setting. Thereafter, the control algorithm 400 may return back to flow step 430 shown in FIG. 9.

Figure 11:
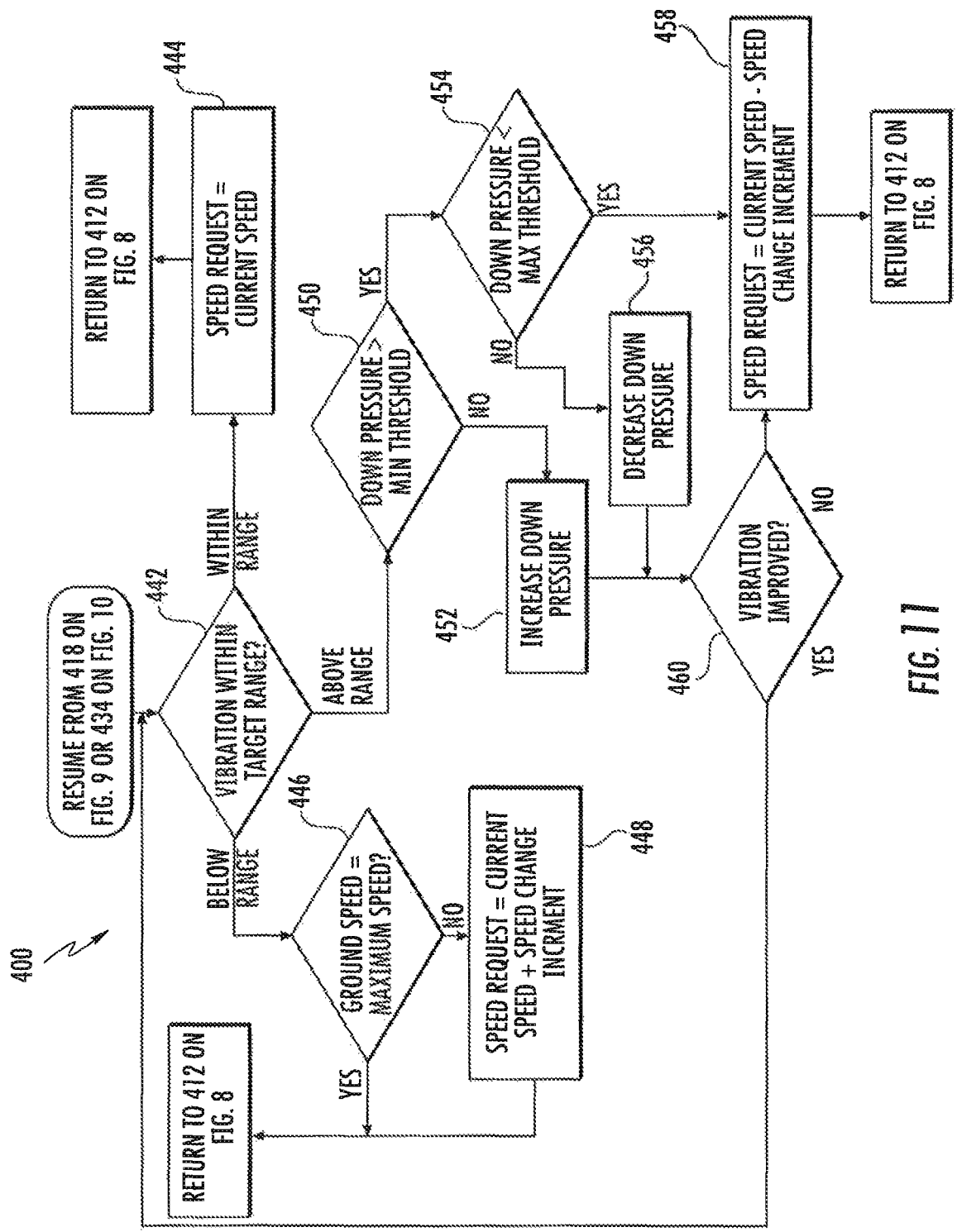
FIG. 11 illustrates a flow diagram showing yet another section of the control algorithm shown in FIG. 8.

Referring now to FIG. 11, when the current seed population is equal to the desired seed population target (e.g., from flow step 418 of FIG. 9) or when the current seed singulation is greater than or equal to the desired seed singulation threshold (e.g., from flow step 434 of FIG. 10), the planter controller 104 may, at (442), determine whether the currently monitored vibrational motion of each active row unit 28 (or the average vibrational motion for the active row units 28) falls within a target vibration range set for the row units 28. If the current vibrational motion falls within the target range, the planter controller 104 may, at (444), change the speed request signal transmitted to the vehicle controller 102 to indicate that the ground speed of the work vehicle 10 should be maintained at the current ground speed. The control algorithm 400 may then return back to flow step 412 shown in FIG. 8. However, if the current vibrational motion is below the target range (e.g., indicating that the row unit(s) 28 are vibrating less than the target range), the planter controller 104 may, at (446), determine whether the current ground speed is equal to the maximum ground speed value set for the work vehicle 10. If the current ground speed is equal to the maximum ground speed value, the control algorithm 400 may be looped back to flow step 412 on FIG. 8 without changing the speed request signal transmitted to the vehicle controller 102. However, if the current ground speed is less than the maximum speed value, the planter controller 104 may, at (448), change the speed request signal transmitted to the vehicle controller 102 to indicate that the current ground speed of the work vehicle 10 should be increased to a new speed corresponding to the sum of the current ground speed plus a given speed change increment value set for the planter 12. For instance, if the speed change increment value is 0.5 MPH for speed increases, the planter controller 104 may be configured to transmit a speed control request to the vehicle controller 102 indicating that the current ground speed of the work vehicle 10 should be increased by 0.5 MPH. Thereafter, the control algorithm 400 may be looped back to flow step 412 on FIG. 8.

Alternatively, if the current vibrational motion is above the target range (e.g., indicating that the row unit(s) 28 are vibrating more than the target range), the planter controller 104 may, at (450), determine whether the current down pressure or force is greater than a minimum down force threshold set for the row units 28. If the down force is not greater than the minimum down force threshold, the planter controller 104 may, at (452), be configured to increase the current down force (e.g., by controlling the operation of the down force actuator 126). However, if the down force is greater than the minimum down force threshold, the planter controller 104 may, at (454), determine whether the current down force is less than a maximum down force threshold set for the row units 28. If the down force is greater than the maximum down force threshold, the planter controller 104 may, at (456), decrease the current down force (e.g., by controlling the operation of the down force actuator 126). However, if the down force is less than the maximum down force threshold, the planter controller 104 may, at (458), change the speed request signal transmitted to the vehicle controller 102 to indicate that the current ground speed of the work vehicle 10 should be decreased to a new speed corresponding to the sum of the current ground speed less a given speed change increment value set for the planter 12. Thereafter, the control algorithm 400 may be looped back to flow step 412 on FIG. 8.

Additionally, as shown in FIG. 11, in the event that the down force is adjusted at (452) or (456), the planter controller 104 may, at (460), be configured to determine whether such adjustment resulted in an increase or decrease in the vibrational motion of the row units 28. If so, the control algorithm 400 may be looped back to flow step 442. However, if no improvement resulted from the down force adjustment, the control algorithm 400 may move to flow step 458 to allow the ground speed of the work vehicle 10 to be reduced.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for providing implement-based speed control for a work vehicle towing a planter having a plurality of row units, the work vehicle including a vehicle controller configured to control the operation of the work vehicle and the planter including a planter controller configured to control the operation of the plurality of row units, the method comprising:
   accessing, with the planter controller, a planter control input associated with at least one predetermined threshold value for a seed-related parameter of at least one row unit of the plurality of row units;
   monitoring, with the planter controller, the seed-related parameter relative to the at least one predetermined threshold value as the planter is being towed at a current ground speed of the work vehicle;
   when the seed-related parameter differs from the at least one predetermined threshold value, automatically adjusting, with the planter controller, an operation of a vacuum source provided in operative association with a seed meter of the at least one row unit to adjust a vacuum pressure applied within the seed meter; and
   when it is determined that the adjustment of the vacuum pressure applied within the seed meter did not reduce the differential between the seed-related parameter and the at least one predetermined threshold value, adjusting, with the planter controller, a speed control request transmitted to the vehicle controller to indicate that the current ground speed of the work vehicle should be decreased and re-setting the vacuum pressure applied within the seed meter to an initial pressure setting previously applied before the adjustment.

2. The method of claim 1, wherein the seed-related parameter corresponds to seed population and wherein adjusting the operation of the vacuum source comprises control ling the operation of the vacuum source to decrease the vacuum pressure applied within the seed meter when the seed population is greater than a desired seed population target.

3. The method of claim 1, wherein the seed-related parameter corresponds to seed population and wherein adjusting the operation of the vacuum source comprises controlling the operation of the vacuum source to increase the vacuum pressure applied within the seed meter when the seed population is less than the desired seed population target.

4. The method of claim 1, wherein the seed-related parameter corresponds to seed singulation and wherein adjusting the operation of the vacuum source comprises controlling the operation of the vacuum source to adjust the vacuum pressure applied within the seed meter when the seed singulation is less than a desired seed singulation threshold.

5. The method of claim 1, wherein adjusting the speed control request transmitted to the vehicle controller comprises adjusting the speed control request by a predetermined speed change increment.

6. The method of claim 1, wherein:
   automatically adjusting the operation of the vacuum source comprises automatically adjusting the operation of the vacuum source to increase the vacuum pressure applied within the seed meter from the initial pressure setting to an increased pressure setting when the seed-related parameter differs from the at least one predetermined threshold value; and
   re-setting the vacuum pressure comprises decreasing the vacuum pressure back to the initial pressure setting when it is determined that the adjustment of the vacuum pressure applied within the seed meter did not reduce the differential between the seed-related parameter and the at least one predetermined threshold value.

7. The method of claim 1, wherein:
automatically adjusting the operation of the vacuum source comprises automatically adjusting the operation of the vacuum source to decrease the vacuum pressure applied within the seed meter from the initial pressure setting to a reduced pressure setting when the seed-related parameter differs from the at least one predetermined threshold value; and
re-setting the vacuum pressure comprises increasing the vacuum pressure back to the initial pressure setting when it is determined that the adjustment of the vacuum pressure applied within the seed meter did not reduce the differential between the seed-related parameter and the at least one predetermined threshold value.

8. A system for providing implement-based speed control for a work vehicle, the system comprising:
a planter including a plurality of row units, each row unit being configured to deposit seeds within the ground as the planter is being towed by the work vehicle;
a planter controller provided in operative association with the planter, the planter controller being configured to control the operation of the plurality of row units; and
a vehicle controller communicatively coupled to the planter controller, the vehicle controller being provided in operative association with the work vehicle and configured to control the operation of the work vehicle,
wherein the planter controller is further configured to:
access a planter control input associated with at least one predetermined threshold value for a seed-related parameter of at least one row unit of the plurality of row units;
monitor the seed-related parameter relative to the at least one predetermined threshold value as the planter is being towed at a current ground speed of the work vehicle;
when the seed-related parameter differs from the at least one predetermined threshold value, automatically adjust an operation of a vacuum source provided in operative association with a seed meter of the at least one row unit to adjust a vacuum pressure applied within the seed meter; and
when it is determined that the adjustment of the vacuum pressure applied within the seed meter did not reduce the differential between the seed-related parameter and the at least one predetermined threshold value, adjust a speed control request transmitted to the vehicle controller to indicate that the current ground speed of the work vehicle should be decreased and re-set the vacuum pressure applied within the seed meter to an initial pressure setting previously applied before the adjustment.

9. The system of claim 8, wherein the seed-related parameter corresponds to seed population, the planter controller being configured to adjust the operation of the vacuum source so as to decrease the vacuum pressure applied within the seed meter when the seed population is greater than a desired seed population target.

10. The system of claim 8, wherein the seed-related parameter corresponds to seed population and, the planter controller being configured to adjust, the operation of the vacuum source so as to increase the vacuum pressure applied within the seed meter when the seed population is less than the desired seed population target.

11. The system of claim 8, wherein the seed-related parameter corresponds to seed singulation, the planter controller being configured to adjust the operation of the vacuum source so as to adjust the vacuum pressure applied within the seed meter when the seed singulation is less than a desired seed singulation threshold.

12. The system of claim 8, wherein the planter controller is configured to adjust the speed control request by a predetermined speed change increment.

13. The system of claim 8, wherein:
the planter controller is configured to adjust the operation of the vacuum source to increase the vacuum pressure applied within the seed meter from the initial pressure setting to an increased pressure setting when the seed-related parameter differs from the at least one predetermined threshold value; and
the planter controller is configured to reduce the vacuum pressure back to the initial pressure setting when it is determined that the adjustment of the vacuum pressure applied within the seed meter did not reduce the differential between the seed-related parameter and the at least one predetermined threshold value.

14. The system of claim 8, wherein:
the planter controller is configured to adjust the operation of the vacuum source to decrease the vacuum pressure applied within the seed meter from the initial pressure setting to a reduced pressure setting when the seed-related parameter differs from the at least one predetermined threshold value; and
the planter controller is configured to increase the vacuum pressure back to the initial pressure setting when it is determined that the adjustment of the vacuum pressure applied within the seed meter did not reduce the differential between the seed-related parameter and the at least one predetermined threshold value.

* * * * *